United States Patent [19]

Meyen et al.

[11] Patent Number: 5,788,430
[45] Date of Patent: Aug. 4, 1998

[54] DRILLING TOOL FOR ROTARY PERCUSSION DRILLING

[75] Inventors: Hans-Peter Meyen, Wolpertswende; Bernhard Moser, Altshausen, both of Germany

[73] Assignee: Hawera Probst GmbH, Ravensburg, Germany

[21] Appl. No.: 617,359

[22] Filed: Mar. 18, 1996

[30] Foreign Application Priority Data

Mar. 17, 1995 [DE] Germany ............ 195 09 213.9
Nov. 3, 1995 [DE] Germany ............ 195 41 009.2

[51] Int. Cl.$^6$ ............ E21B 10/26; E21B 10/36; B23B 51/00
[52] U.S. Cl. ............ 408/226; 175/381; 175/412; 175/415; 279/19.5; 408/204; 408/224
[58] Field of Search ............ 175/381, 385, 175/389, 395, 405, 412, 414, 415; 408/204, 226, 206, 223, 224; 279/19.3, 19, 19.4, 19.5, 97

[56] References Cited

U.S. PATENT DOCUMENTS

| 981,899 | 1/1911 | Taylor | 279/19 |
|---|---|---|---|
| 1,423,595 | 7/1922 | Bayles | 279/19.5 |
| 1,746,455 | 2/1930 | Woodruff et al. | 175/381 |
| 1,757,444 | 5/1930 | Stevens | 279/19.5 |
| 1,796,487 | 3/1931 | Stevens | 279/19 |
| 2,224,063 | 12/1940 | Roberts | 279/19.5 |
| 4,202,557 | 5/1980 | Haussmann et al. | 279/19.5 |
| 4,354,561 | 10/1982 | Logan, Jr. | 175/389 |

FOREIGN PATENT DOCUMENTS

| 0 474 591 | 3/1992 | European Pat. Off. . |
|---|---|---|
| 0589108A1 | 3/1994 | European Pat. Off. . |
| 620868 | 4/1927 | France .................. 175/414 |
| 1906218 | 12/1964 | Germany . |
| 1992344 | 4/1968 | Germany . |
| 7526847 | 1/1976 | Germany . |
| 2856205 | 7/1980 | Germany . |
| 3322887A1 | 1/1985 | Germany . |
| 8521577.5 | 5/1986 | Germany . |
| 3614010A1 | 11/1987 | Germany . |
| 3637456A1 | 5/1988 | Germany . |
| 89 10 822 | 2/1990 | Germany . |
| 40 32 064 | 4/1991 | Germany . |
| 2 173 431 | 10/1986 | United Kingdom . |

*Primary Examiner*—Steven C. Bishop
*Attorney, Agent, or Firm*—Spencer & Frank

[57] ABSTRACT

A drilling tool for rotary percussion drilling including: a drilling body defining: a longitudinal centerline axis extending in a drilling direction; a bore extending in a direction of the centerline axis and having a bore bottom; and a recess extending in a direction transverse to the centerline axis and eccentrically with respect thereto. A centering drill is adapted to move in the drilling direction and has a centering drill end, a centering drill shank and a chucking portion having a flattened clearance on one side thereof, the centering drill shank having an end side cylinder section for limiting an axial path of the centering drill during its movement in the drilling direction, the centering drill extending in the bore of the drilling body and the bore bottom being effective as an exclusive stop for the centering drill end when the centering drill is being subjected to percussion stress. A pin-shaped holding device secures and positions the centering drill in the bore of the drilling body and further extends in the recess and penetrates into the bore at a region of the chucking portion of the centering drill for receiving the centering drill, the end side cylinder section being configured for preventing an insertion of the centering drill into the bore when the holding means extends in the recess.

19 Claims, 5 Drawing Sheets

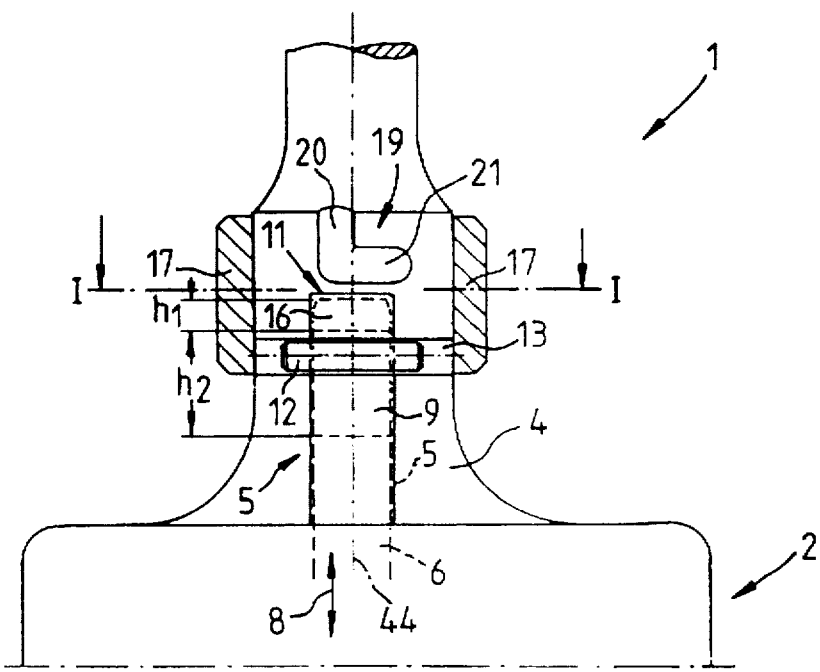
Fig. 1a
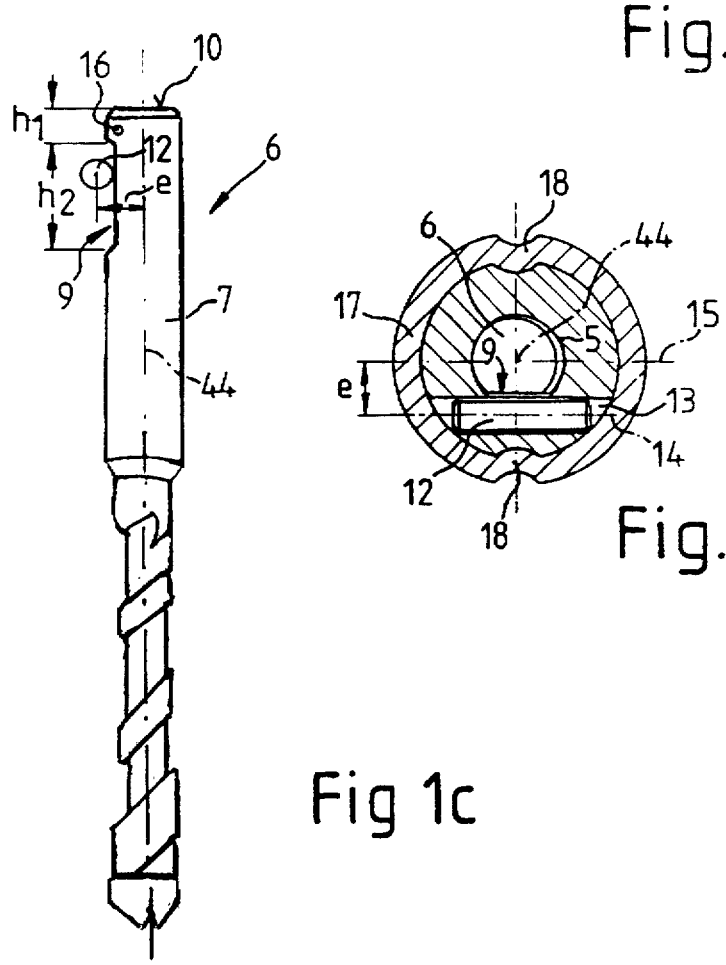
Fig. 1b
Fig 1c

DRILLING TOOL FOR ROTARY PERCUSSION DRILLING

FIELD OF THE INVENTION

The invention relates to a drilling tool especially for the rotary percussion drilling of preferably rock.

BACKGROUND OF THE INVENTION

Drilling tools and especially rock drills are used for making perforations in concrete or masonry and, in particular, are also designed for use in drilling hammers. To make relatively large perforations, so-called drill crowns, such as are represented by way of example in DE 3,322,887, are generally used. Such a drill crown consists of a pot-shaped housing with hard-metal cutting bits arranged on the end face. A concentrically inserted centering drill serves for centering, especially during the initial drilling of the rock material.

Furthermore, to make generally relatively small perforations, so-called perforation drills have become known, these generally consisting of a solid drill head, the drill shank being provided with an integral or separate conveying helix (DE 2,856,205 A1; DE 3,614,010 A1). The rock drill according to DE 2,856,205 too has a pot-shaped cross-drilling head, with a separately insertable centering drill.

Both with drill crowns and with perforation drills having exchangeable centering drills, there is the problem of placing the centering drill firmly, but also exchangeably in a bore in the drilling tool. For this purpose, this bore for receiving the centering drill is designed generally conically, in order to receive a likewise conical centering drill shank. However, exchange after a lengthy operation of the drilling tool may present problems, since the clamping effect of the conical faces is so great that the centering drill cannot be removed without further action. For this purpose, DE 3,322,887 provides, for example, a transverse bore, in which the end of the centering drill projects. The centering drill can then be pressed out by means of a separate tool. However, such a transversely extending recess at the end of the conical seat in the drill crown shank constitutes a disturbance of cross section which impairs the transmission of percussion movements. Moreover, the cross section of the tool shank is weakened adversely.

Furthermore, DE 3,322,887 has, on the centering drill, a retaining element which is designed as a separate ring and which is to prevent falling-out during operation. However, this device serves merely to prevent the centering drill from falling out inadvertently. Normally, the centering drill is seated firmly in the drill crown as a result of the conical frictional connection.

A further known solution according to German Utility Model GM 1,992,344 provides for the centering drill of a drill crown to be fastened axially non-displaceably within the drill crown shank by means of a bayonet-like connection. For this purpose, the centering drill has, at the rear end of its chucking shank, a flattening which cooperates with a bolt located eccentrically in a transverse bore. An additional groove approximately perpendicular to the flattening is connected to the transverse bolt in the manner of a bayonet fastening by a rotation of the drill. The centering drill shank is thereby secured axially non-displaceably against falling out.

The general prior art also includes fixing the centering drill in a drill crown by means of a transverse screw. In this case, the centering drill is recessed in the drill longitudinal direction in the region of the penetrating screw, so that, where appropriate, an axial movement of the drill can also be carried out.

The subject of Utility Model DE-U1-85 21 577 also shows a drill crown, with an axially movable centering drill, laterally arranged setscrews projecting into the receiving bore for the centering drill. In this case, the centering drill is designed as a known "SDS drill" which has longitudinal grooves for separate rotational takeup as well as axial securing by means of elements which in each case are separate. Such a tool, admittedly, allows a cost-effective use of a known SDS drill. However, the mechanical outlay on the shank of the drill crown is considerable.

The disadvantage of the known solutions having an axially movable centering drill is also that, during rotary percussion drilling, the centering drill executes relative to the remaining tool longitudinal and rotational oscillating movements which, under high stress, lead to destruction of the holding means for the centering drill. In particular, for example, the thread of a transverse holding pin is destroyed relatively quickly as a result of these oscillations. Also, in the case of percussion stress with an axially displaceable centering drill, the multiplicity of individual parts used according to Utility Model GM 85 21 577 are exposed to high wear.

Furthermore, the fixed attachment of the centering drill, for example by means of a conical seat, has the disadvantage that the drilling capacity is markedly reduced, in comparison with an embodiment in which the centering drill itself can be set in axial oscillating movement as a result of percussion stress.

SUMMARY OF THE INVENTION

The object on which the invention is based is to avoid the disadvantages of the previously explained prior art and, in particular, to provide a mounting for a centering drill in a drilling tool, which mounting is intended especially for rotary percussion use and has long service lives, easy exchangeability of the centering drill and an improved drilling capacity.

The above object and many others to become apparent as the description progresses are achieved by a drilling tool according to the invention which includes a drilling body having a drilling side and including cutting bits disposed at its drilling side, the drilling body further defining: a longitudinal centerline axis extending in a drilling direction; a bore extending in a direction of the centerline axis and having a bore bottom; and a recess extending in a direction transverse to the centerline axis and eccentrically with respect thereto. The drilling tool further includes a centering drill adapted to move in the drilling direction and having a centering drill end, a centering drill shank and a chucking portion having a flattened clearance on one side thereof, the centering drill shank having an end side cylinder section in a region of the flattened clearance of the chucking portion for limiting an axial path of the centering drill during its movement in the drilling direction, the centering drill extending in the bore of the drilling body and the bore bottom being effective as an exclusive stop for the centering drill end when the centering drill is being subjected to percussion stress during its movement in the drilling direction. A pin-shaped holding device secures and positions the centering drill in the bore of the drilling body, the holding device extending in the recess and penetrating into the bore at a region of the chucking portion of the centering drill for receiving the centering drill, the holding device thereby extending transversely and eccentrically with respect to the centerline axis of the drilling body, the end side cylinder section being configured for preventing an insertion of the centering drill into the bore when the holding means extends in the recess. Advantageous and expedient developments of the tool according to the invention are further specified below.

The invention is based on the essential notion that a drilling tool especially for the rotary percussion drilling of rock is to be provided in an advantageous way with an exchangeable centering drill which is designed as a wearing part. At the same time, the centering drill itself is to be mounted axially movably within its receiving bore, in order to be subjected to percussion stress, according to the invention the centering drill being secured against falling out via a bar-shaped or tubular holding element. For this purpose, there is located in the drilling tool a recess or bore which is arranged transversely to the axial drilling direction and into which the holding means penetrates eccentrically relative to the longitudinal axis of the drilling tool and cooperates with a lateral clearance or flattening on the centering drill shank, in such a way that, despite axial movability, the centering drill is prevented from falling out and, at the same time, rotational takeup is provided. This constitutes an especially simple and cost-effective solution, since the bar-shaped or tubular holding means serves at the same time as a rotational takeup and axial securing of the centering drill. For the exchange of the pin-like holding means, the latter can easily be removed from the transverse bore. The pin-like holding means, for example in the drill crown shank or in the drill head of a perforation drill, consequently penetrates into the receiving bore of the centering drill eccentrically and virtually tangentially to the centering drill. On account of the clearance located there in the centering drill shank in this region, the centering drill can execute longitudinal oscillating movements in the axial direction, the bore for receiving the centering drill preferably being designed in such a way that the bore bottom serves at the same time as a stop for the centering drill end, in order to transmit the axial percussions of the drilling tool to the centering drill. By virtue of the axial movability of the centering drill, the latter can execute oscillating movements relative to the remaining drilling tool. This avoids a reduction in the drilling capacity, such as occurs, for example, in an embodiment having a stationary centering drill. The centering drill, including its holding means, undergoes virtually no wear in this region. Furthermore, the exchange of the mounting and/or centering drill is easily possible. The eccentric mounting on the centering drill ensures that a reliable rotational takeup of the centering drill is guaranteed.

Such an arrangement can be used without difficulty both in the case of a drill crown and, for example, also in the case of known perforation drills, so that exchangeable centering drills can be used.

It is particularly advantageous, furthermore, if the recess for receiving the holding means passes completely through the drilling tool in a transverse direction. The bar-shaped or tubular holding means can thereby be removed in a simple way. At the same time, the invention provides holding means which are arranged loosely within the transverse bore. In this case, falling-out is dealt with by additional slip-over measures which prevent the holding means from escaping laterally. However, the holding means itself can also be arranged non-positively within the transverse recess or bore, preferably so-called dowel pins proving to be cost-effective. These can simply be knocked out laterally.

BRIEF DESCRIPTION OF THE DRAWINGS

Various exemplary embodiments of the invention are represented in the drawings. These are explained in more detail in the following description, with further particulars and advantages of the invention being specified. In the drawings:

FIGS. 1a–c show a first exemplary embodiment of a drilling tool designed as a drill crown, with a loosely movable holding means and with a locking ring in a side view, in a sectional representation along the sectional line I—I and in an individual representation of the centering drill, FIGS. 2a,b show an exemplary embodiment alternative to that of FIG. 1, with a securing of the holding means via a spring element, in two side views.

DETAILED DESCRIPTION OF THE INVENTION

Figure 2A:
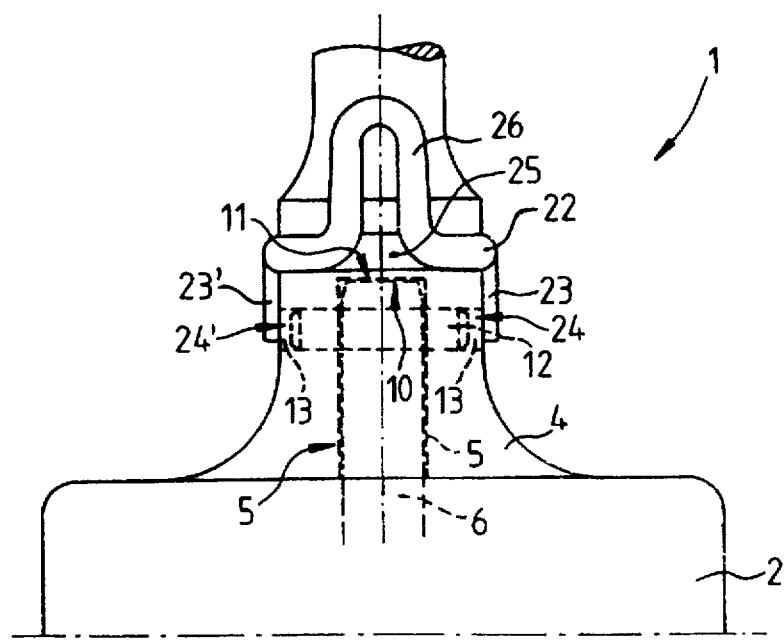

The present invention can, in principle, be implemented on various drilling tools, as is represented by way of example in FIGS. 1, 2, 7 and 10. In particular, the mounting according to the invention of a centering drill can take place in a drill crown or also in a perforation drill having a cross-cutting head or the like.

FIGS. 1a to 1c represent a first exemplary embodiment of a drilling tool 1, comprising a drill crown 2 which is integrally connected to a shank part 4. The basic design of such a drill crown is described in DE 3,322,887. Reference is made to this.

The shank part 4 has a central bore 5 which serves for receiving a centering drill 6. The cylindrical bore 5 in the shank part 4 and the cylindrical shank part 7 of the centering drill 6 are coordinated with one another in such a way that the centering drill 6 can move axially, this being identified by the arrow 8. The axial movability of the centering drill 6 is achieved by means of a lateral plane clearance 9 or flattening 9 which is located at a slight distance h1 behind the stop face 10 of the centering drill 6 and which extends over a height segment h2.

The centering drill 6 projects with its stop face 10 in the bore 5 as far as the bottom 11 of the bore 5 and, from here, is subjected to percussion stress.

So that the centering drill 6, by virtue of its axial movability, does not fall out of the bore 5 of the drilling tool 1, said centering drill is held by a bar-shaped or tubular holding means 12 which, for example, is also designed as a cylindrical pin 12 and which is located in a transverse bore 13 in the shank part 4 of the drilling tool 1. As is evident from FIG. 1b as a section I—I through FIG. 1a, the transverse bore 13 is arranged with its bore longitudinal axis 14 eccentrically by an amount e relative to the transverse axis of symmetry 15 of the shank part 4 or of the drill longitudinal axis 44. The eccentricity e is of such dimension that the transverse holding means 12 bears tangentially on the plane clearance 9 of the centering drill 6 and consequently brings about a rotational takeup via this face portion. The centering drill 6 is prevented from falling out by the end cylinder portion 16 having the height hi, that is to say the centering drill 6 can move axially within the bore 5 of the drilling tool 1, without falling out of the bore.

The aforesaid basic principle is preserved in all the exemplary embodiments described in the present invention. The form of construction of the bar-like or tubular holding means 12, which is also designed, for example, as a cylindrical pin in FIGS. 1a, 1b, is different.

The pin-like holding means 12 according to FIGS. 1a, b is mounted with play in the transverse bore 13, so that falling out laterally is prevented by the locking ring 17. The locking ring 17 covers the transverse bore 13 and is pushed onto the cylindrical shank part 4. For the retention of the locking ring 17, the latter has a bead 18 which cooperates with an angled groove 19 in a bayonet-like manner. For this purpose, the bead 18 is first rotated downwards via a vertical groove part 20 and then into a horizontal groove part 21. The groove depth of the horizontal groove part 21 can decrease in the direction of the groove end, with the result that the bead 18 is jammed.

FIGS. 2a, b show a further exemplary embodiment of a drilling tool having a drill crown 2. Like parts are designated by the same reference symbol as in FIG. 1a.

The centering drill 6 is once again positioned and secured in the shank part 4 by a bar-shaped and tubular holding means 12, a spring element 22 being inserted for securing the cylindrical holding element 12 in the transverse bore 13. The spring element 22, by means of its two angled ends 23, 23', closes the two lateral orifices 24, 24' of the transverse bore 13 in the drill crown shank 4. The holding means 12 arranged movably in the transverse bore 13 therefore cannot fall out while the drilling tool is being used. In order to guarantee a secure fit of the spring element 22, the latter is guided in a groove 25. In addition, the spring element 22 extends over somewhat more than half the circumference of the shank part 4 at this location, with the result that the spring element 22 can be snapped on. In order to change the centering drill 6, the spring element 22 is pulled off by means of a shackle 26 bent round upward, the cylindrical holding element 12 is extracted and the centering drill 6 is pulled out of the bore 5. No tool of any kind is necessary for this purpose.

The further FIGS. 3 to 6 represent four different exemplary embodiments having a centering drill mounting according to the invention in a sectional top view, as basically corresponds to FIG. 1b. Like parts are provided, where appropriate, with the same reference symbols.

In all the exemplary embodiments according to FIGS. 3 to 6, a spring element is used to secure and position the bar-shaped or tubular holding means 12. The various spring elements are designated by reference symbols 27 to 30. In all four exemplary embodiments, the respective spring element 27 to 30 is guided in a groove 25. This prevents the respective spring element 27 to 30 from being knocked loose or released during the rotary percussion use of the drill crown.

Figure 2B:
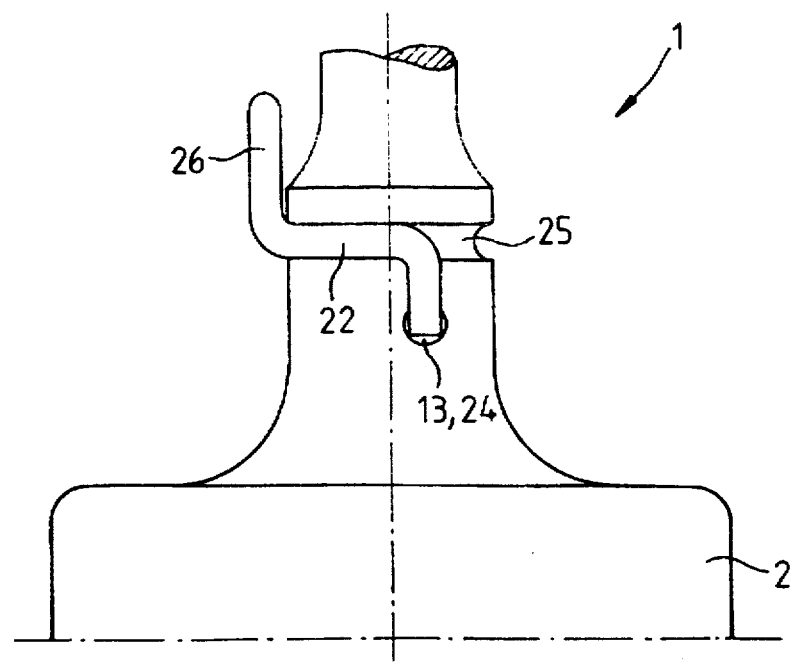
Figure 3:
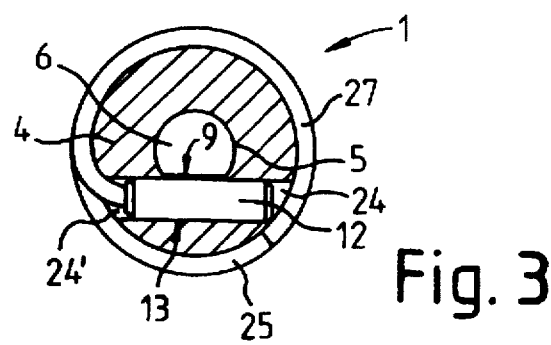
FIGS. 3–6 show four further exemplary embodiments in order to represent different securings of the holding element in the transverse bore, FIGS. 7a,b show a further exemplary embodiment of a centering drill mounting according to the invention on a drill crown, with an elastic sleeve for securing the holding element, in a side view and in a sectional top view along the sectional line VII—VII.

In FIG. 3, as described with reference to FIGS. 1 and 2, the centering drill 6 is positioned and secured in the bore 5 of the drilling tool 1 with longitudinal play by the pin-like holding means 12. To secure the pin-like holding means 12, the spring element 27 engages on one side into the lateral orifice 24' of the transverse bore 13, in which the holding means 12 is arranged movably. On the opposite side, the end of the spring element 27 covers the other orifice 24 of the transverse bore 13. The holding means 12 is consequently unequivocally secured against falling out. The spring element 27 guided in the groove 25 is self-locking, since it surrounds a larger region than half the circumference of the drill crown shank 4. Moreover, it is retained in its position by the end bent into the orifice 24'.

Figure 4:
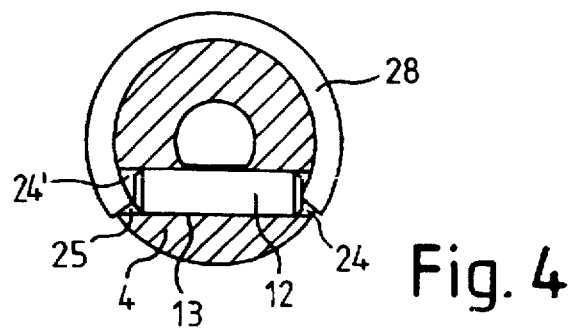

FIG. 4 shows a further exemplary embodiment, both ends of the spring element 28 engaging into the respective orifices 24, 24' of the transverse bore 13 in order to secure the holding means 12.

Figure 5:
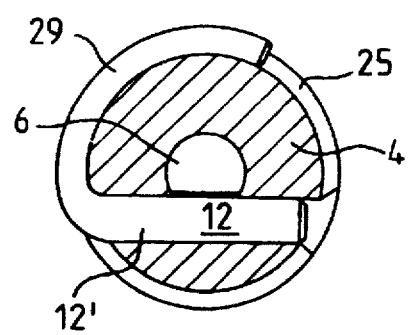

FIG. 5 shows a further exemplary embodiment, in which the centering drill 6 is positioned and held by a modified pin-like holding means 12' in the shank 4, the spring element 29 being formed at one end onto the holding means 12'. In this solution too, when the centering drill 6 is being changed, the pin-like holding means 12' with formed-on spring element 29 merely has to be pulled off from the groove 25. Self-locking is achieved in that the formed-on spring element 29 extends over a sufficiently large region of the circumference of the shank 4.

Figure 6:
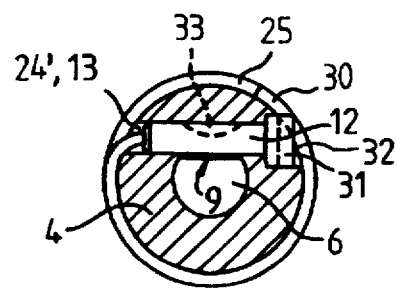

FIG. 6 shows, as a further exemplary embodiment, the centering drill 6 in the shank 4 of the drilling tool, said centering drill being once again positioned and secured by a cylindrical holding means 12, the pin-like holding means 12 possessing a head 31 provided with a slot. The spring element 30 guided in the groove 25 runs through the slot 32 in the head 31 of the holding means 12. The spring element 30 therefore not only prevents the pin-like holding means 12 from falling out of the transverse bore 13, but also prevents a rotation of the holding means about its longitudinal axis. At the same time, the spring element 30 once again engages on one side into the recess 24' of the transverse bore, thereby preventing a twisting of the spring element 30 along the groove 25.

In the position shown, the removal of the centering drill 6 is blocked by the holding means 12. However, if the pin-like holding means 12 is rotated 180° about its longitudinal axis, the centering drill 6 can be pulled out in the axial direction in a simple way by virtue of a clearance 33 in the pin-like holding means 12. The spring element 30 is also self-locking, since it surrounds more than half the circumference of the drill crown shank 4. Furthermore, just as in the preceding exemplary embodiments, the spring element 30, the pin-like holding means 12 and therefore the centering drill 6 can be demounted and exchanged without a tool.

Figure 7A:
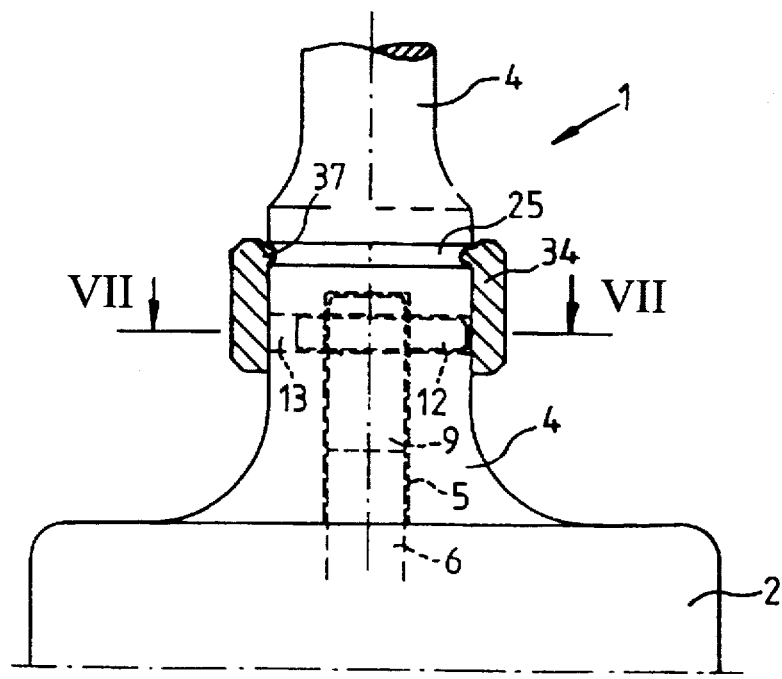
Figure 7B:
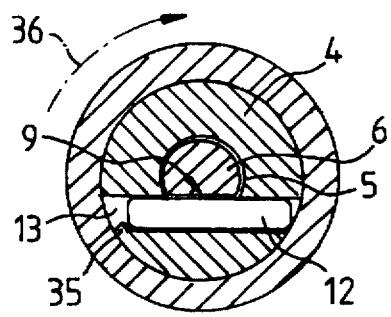

In the further exemplary embodiment according to FIGS. 7a, b, the centering drill 6 is arranged in the bore 5 of the shank part 4 of a drill crown 2 and once again is positioned and held with the aid of a cylindrical holding means 12 in the transverse bore 13. The holding means 12 is positioned and secured on one side by an elastic sleeve 34 and on the other side, at that end of the transverse bore 13 facing the direction of rotation, by a stop 35. The direction of rotation is symbolized by the dot-and-dash arrow 36 in FIG. 7b. Located once again on the drill crown shank 4 is a peripheral groove 25 which positions and secures the elastic sleeve 34 on the shank in a suitable way. For this purpose, the elastic sleeve 34 has a correspondingly adapted, likewise peripheral elevation 37 which cooperates with the groove 25. As also in the exemplary embodiments described previously, when the centering drill 6 is being inserted into the bore 5 the plane lateral clearance 9 on the centering drill shank 7 is twisted in such a way that the pin-like holding means 12 comes to rest along the plane recess and, in the present case, can be introduced into the recess 13 as far as the stop 35. It is thereafter necessary merely to slip the elastic sleeve 34 over the shank 4 of the drilling tool 1 from above, elevation 37 fitting positively into the groove 25 in the shank 4. At the same time, the stop 35 absorbs all the forces which occur and which, on account of the centrifugal force, would possibly force the pin-like holding means 12 out of that end of the transverse bore 13 pointing in the direction of rotation. At the opposite end of the transverse bore 13, it is perfectly sufficient to fix the pin-like holding means 12 solely by the elastic sleeve 34. With this type of fastening according to the invention too, it is possible to insert the centering drill 6 and exchange it for a new one entirely without a tool.

Figure 8:
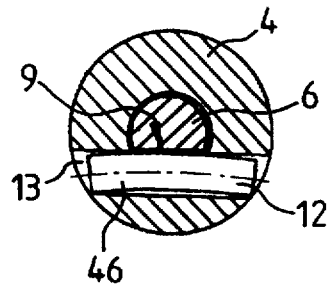
FIG. 8 shows an alternative exemplary embodiment for the use of a holding means with a non-positive arrangement within the transverse bore.

FIG. 8 shows a further exemplary embodiment with a centering drill 6 which is positioned and secured by a further cylindrical holding means 12. The particular feature of this embodiment is that the holding means is intrinsically curved and is therefore braced in the transverse bore 13. Admittedly, the use of this holding means 12 necessitates a tool, such as, for example, a hammer or a punch. In return, no additional securing elements are required for the holding means 12. At the same time, the curved holding means is capable of absorbing the forces occurring in the centering drill 6 which, once again, bears with its plane clearance 9 against the pin-like holding means 12, in order to bring about axial securing and rotational takeup. The remaining design and mode of operation correspond to the exemplary embodiments described previously.

Figure 9A:
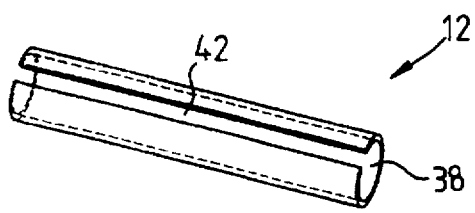
FIGS. 9a–c show various embodiments of bar-shaped or tubular holding means for use in one or more of the exemplary embodiments shown previously, and FIG. 10 show a further exemplary embodiment of a drilling tool according to the invention which is designed as a perforation drill, for example with a cross-drilling head.
Figure 9B:
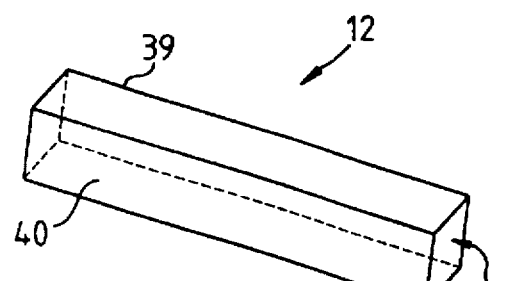
Figure 9C:
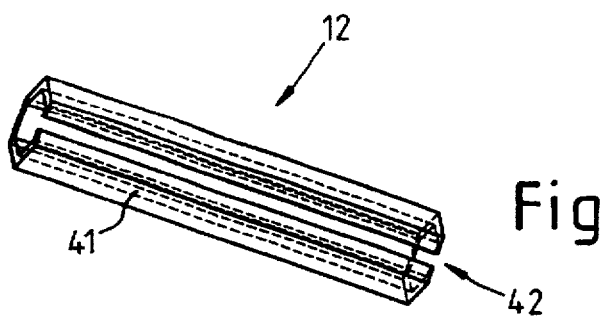

FIGS. 9a to 9c represent further alternative embodiments of the bar-shaped or tubular holding means 12. In FIGS. 1a to 7b, this holding means is formed from solid material essentially as a pin-like cylindrical holding means. In this case, this cylindrical pin is inserted with play into the respective bore 13 and is secured against falling out by additional measures located on the outside of the shank 4. Furthermore, FIG. 8 shows a slightly curved cylindrical holding means 12 which is jammed in the bore 13 as a result of its longitudinal axis 46 having a curvature.

The holding means 12 represented in FIG. 9a is a tubular holding means 12 and, in particular, a conventional dowel pin 38 according to German Industrial Standards DIN 1481 or DIN 6365. Dowel pins of this type are extremely cost-effective and, by virtue of their longitudinal slot 42, can be inserted into the transverse bore 13 non-positively and/or positively. The longitudinal slot 42 makes it possible to reduce the outside diameter when such a holding means is knocked in, so that non-positive bracing in the respective transverse bore 13 occurs. It is expedient to position the longitudinally slotted dowel pin 12, 38 according to FIG. 9a in the bore in such a way that the longitudinal slot 42 is located opposite the plane clearance 9 of the centering drill 6.

FIG. 9b represents a right-parallelepipedic holding means 12, the bar-shaped right parallelepiped 39 of which has a square cross section 45 in longitudinal section. In this case, the transverse bore 13 can likewise have a square cross section adapted to this. On such an embodiment, the large-area bearing of a longitudinal side 40 of the right parallelepiped 39 against the plane clearance 9 of the centering drill 6 is advantageous in comparison with only linear contact in the case of a cylindrical holding means 12.

Finally, FIG. 9c shows a tubular holding means 12 which is designed as a polygonal body 41. Here, the basic notion of the dowel pin 38 represented in FIG. 9a is combined with the large-area bearing, described with reference to FIG. 9b, against the plane clearance 9 of the shank part 7 of the respective centering drill 6. In this case, of course, the transverse bore 13 can likewise be made cylindrical, this being fundamentally possible also in the exemplary embodiment according to FIG. 9b having the right-parallelepipedic holding means. As in FIG. 9a, the polygonal body 41 having a polygon-like and especially hexagonal cross section is made tubular with a longitudinal slot 42 for the purpose of bracing.

Figure 10:
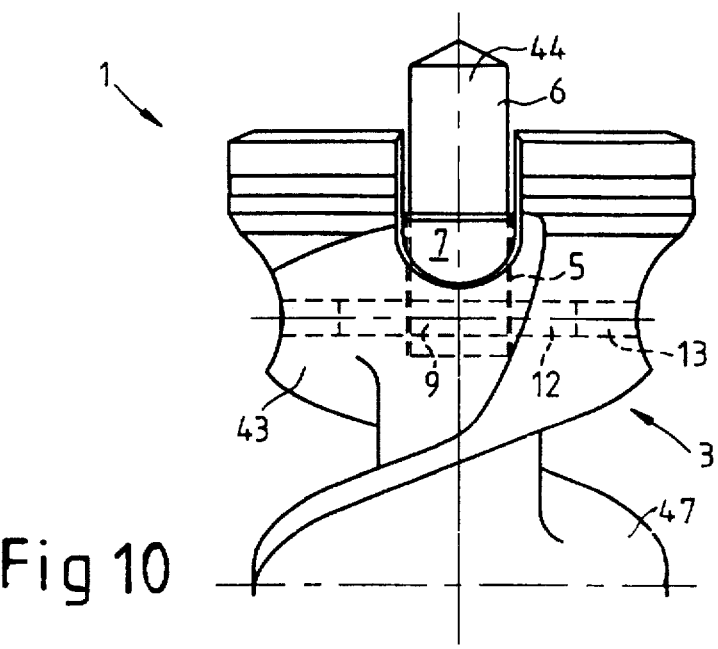

Finally, FIG. 10 shows a further exemplary embodiment of the invention having a drilling tool 1 designed as a perforation drill 3, with an exchangeable centering drill 6. Such a tool basically corresponds to the initially mentioned DE 2,856,205.

The exemplary embodiment according to FIG. 10 corresponds in its more detailed design to a drilling tool, such as is shown by way of example in the applicant's DE 4,236, 553. Reference is herewith made expressly to this description of the drilling tool. The form in which the centering drill is arranged on the tool is left undecided there.

For securing and positioning a centering drill 6 insertable exchangeably in such a tool, the drill head 43 once again has a suitable transverse bore 13 which is located in the transitional region between the drill head 43 and conveying helix 47 and into which preferably a self-locking holding means 12 is inserted. Embodiments especially according to FIGS. 8, 9a and 9c can be used as a self-locking holding means.

In principle, the self-locking holding means 12 once again cooperates with a plane clearance 9 of shank part 7 of the centering drill 6, the clearance 9 arranged eccentrically or off-center relative to the drill longitudinal axis 44 in the same way as previously described. Fastening and positioning as well as retention take place in the same way as previously described.

The invention is not restricted to the exemplary embodiments represented and described. On the contrary, it also embraces all developments open to an average person skilled in the art within the scope of the patent claims.

We claim:

1. A drilling tool for rotary percussion drilling comprising:

a drilling body having a drilling side and including cutting bits disposed at its drilling side, the drilling body further defining:

a longitudinal centerline axis extending in a drilling direction;

a bore extending in a direction of the centerline axis and having a bore bottom; and a recess extending in a direction transverse to the centerline axis and eccentrically with respect thereto;

a centering drill being adapted to move in the drilling direction and having a centering drill end, a centering drill shank and a chucking portion having a flattened clearance on one side thereof, the centering drill shank having an end side cylinder section in a region of the flattened clearance of the chucking portion for limiting an axial path of the centering drill during its movement in the drilling direction, the centering drill extending in the bore of the drilling body and the bore bottom being effective as an exclusive stop for the centering drill end when the centering drill is being subjected to percussion stress during its movement in the drilling direction; and a pin-shaped holding means for securing and positioning the centering drill in the bore of the drilling body, the holding means extending in the recess and penetrating into the bore at a region of the chucking portion of the centering drill for receiving the centering drill, the holding means thereby extending transversely and eccentrically with respect to the centerline axis of the drilling body, the end side cylinder section being configured for preventing an insertion of the centering drill into the bore when the holding means extends in the recess.

2. The drilling tool according to claim 1, wherein the drilling tool is one of a drill crown having a drill crown shank and a perforation drill having a cross drilling head and a conveying helix operatively connected to the drilling head.

3. The drilling tool according to claim 2, wherein the recess passes at least partially through one of the crown shank, the drilling head and a transition region between the drilling head and the conveying helix.

4. The drilling tool according to claim 1, wherein the holding means is at least one of bar-shaped and tubular and is disposed one of movably, braceably and self-lockingly in the recess of the drilling body.

5. The drilling tool according to claim 1, wherein the drilling tool is one of a drill crown having a drill crown shank and a perforation drill having a cross drilling head and a conveying helix operatively connected to the drilling head, the drilling tool further comprising a spring element disposed on one of the drill crown shank and at a transition region between the drilling head and the conveying helix for securing and positioning the holding means.

6. The drilling tool according to claim 5, wherein the drill crown shank defines a groove extending at least partially about an outside periphery thereof, the groove being adapted to receive the spring element therein for securing and positioning the spring element.

7. The drilling tool according to claim 2, wherein the drill crown shank defines a groove therein, the drilling tool further comprising a locking ring which is at least partially closed, the locking ring being disposed on the drill crown shank for securing and positioning the holding means, the locking ring further defining a projection thereon adapted to be retained one of positively and non-positively in the groove of the drill crown shank.

8. The drilling tool according to claim 2, further comprising one of a spring element and a locking ring disposed on one of the drill crown shank and at a transition region between the drilling head and the conveying helix for securing and positioning the holding means, wherein the one of the spring element and the locking ring is configured to be engaged with and disengaged from one of the drill crown shank and at a transition region between the drilling head and the conveying helix without using a tool.

9. The drilling tool according to claim 5, wherein the holding means includes a head portion at one side thereof, the head portion having a stop face and defining a slot therein, the spring element engaging within the slot of the head portion.

10. The drilling tool according to claim 2, wherein the drill crown shank defines a groove therein, the drilling tool further comprising an elastic sleeve disposed on the drill crown shank for securing and positioning the holding means in the recess, the elastic sleeve defining a projection thereon engaging in the groove of the drill crown shank for securing and positioning the elastic sleeve thereon.

11. The drilling tool according to claim 10, wherein the groove defined by the drill crown shank extends in a plane which does not intersect the recess and the bore defined by the drilling body for ensuring a positive fastening of the elastic sleeve to the drill crown shank.

12. The drilling tool according to claim 2, wherein the drilling body defines a stop projecting into one end of the recess in a direction of rotation of the drill crown for securing and positioning the centering drill.

13. The drilling tool according to claim 1, wherein the holding means is a cylindrical pin which is curved relative to a longitudinal axis thereof, the cylindrical pin being braceably inserted in the recess.

14. The drilling tool according to claim 1, wherein the holding means is at least one of a tubular and a longitudinally slotted cylindrical pin inserted one of loosely and braceably in the recess.

15. The drilling tool according to claim 1, wherein the holding means is tubular and is configured as a dowel pin according to one of German Industrial Standard 1481 and German Industrial Standard 6325.

16. The drilling tool according to claim 1, wherein the holding means has a polygonal cross section.

17. The drilling tool according to claim 1, the flattened clearance on the centering drill shank has an axial length larger than an axial stroke length of a percussion movement of the centering drill.

18. The drilling tool according to claim 1, wherein the flattened clearance is limited by the end side cylinder section.

19. The drilling tool according to claim 1, wherein the holding means is effective for establishing a rotational take-up and an axial securing of the centering drill, the centering drill being axially freely moveable.

* * * * *